United States Patent
Lee et al.

(10) Patent No.: US 9,151,631 B2
(45) Date of Patent: Oct. 6, 2015

(54) VEHICLE FUELING ROUTE PLANNING

(71) Applicant: Ford Global Technologies, LLC, Dearborn, MI (US)

(72) Inventors: Benjamin F. Lee, Dearborn, MI (US); Scott J. Cutler, Ann Arbor, MI (US); Peter Christ Korovesis, Livonia, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 33 days.

(21) Appl. No.: 14/052,941

(22) Filed: Oct. 14, 2013

(65) Prior Publication Data

US 2015/0106001 A1   Apr. 16, 2015

(51) Int. Cl.
   *G01C 21/30*   (2006.01)
   *G01C 21/34*   (2006.01)
   *G01C 21/36*   (2006.01)

(52) U.S. Cl.
   CPC ............ *G01C 21/3469* (2013.01); *G01C 21/36* (2013.01)

(58) Field of Classification Search
   None
   See application file for complete search history.

(56) References Cited

U.S. PATENT DOCUMENTS

| | | | | |
|---|---|---|---|---|
| 5,742,922 A * | 4/1998 | Kim | ............................... | 701/423 |
| 5,815,824 A | 9/1998 | Saga et al. | | |
| 5,913,917 A * | 6/1999 | Murphy | ........................ | 701/123 |
| 6,005,494 A * | 12/1999 | Schramm | ................. | 340/995.19 |
| 6,424,893 B1 * | 7/2002 | Byrne et al. | ................... | 701/527 |
| 6,591,185 B1 * | 7/2003 | Polidi et al. | ..................... | 701/411 |
| 7,565,230 B2 * | 7/2009 | Gardner et al. | .............. | 701/32.7 |
| 8,014,914 B2 | 9/2011 | Boss et al. | | |
| 8,116,972 B2 * | 2/2012 | Klampfl et al. | ............... | 701/123 |
| 8,135,538 B2 * | 3/2012 | Geelen et al. | ................. | 701/533 |
| 8,280,619 B2 * | 10/2012 | Watkins | ........................ | 701/123 |
| 8,301,365 B2 | 10/2012 | Niwa et al. | | |
| 8,340,884 B1 * | 12/2012 | He et al. | ......................... | 701/103 |
| 8,374,781 B2 * | 2/2013 | Hartman | ........................ | 701/439 |
| 8,452,529 B2 | 5/2013 | Alten | | |
| 8,538,677 B2 * | 9/2013 | Gutman | ......................... | 701/400 |
| 8,538,694 B2 * | 9/2013 | Conway | ......................... | 701/533 |
| 8,560,216 B1 * | 10/2013 | Kahn et al. | ..................... | 701/123 |
| 8,589,076 B2 * | 11/2013 | Hamilton et al. | .............. | 701/532 |
| 8,612,082 B2 * | 12/2013 | Hashimoto et al. | ............. | 701/22 |
| 8,626,436 B2 * | 1/2014 | Gutman | ......................... | 701/408 |
| 8,630,791 B2 * | 1/2014 | Yuasa | ............................ | 701/123 |
| 8,655,586 B2 * | 2/2014 | Jotanotive | ...................... | 701/457 |
| 8,676,400 B2 * | 3/2014 | Tippelhofer et al. | ............. | 701/1 |
| 8,798,830 B2 * | 8/2014 | Sobue et al. | ..................... | 701/22 |
| 8,849,499 B2 * | 9/2014 | Profitt-Brown et al. | ...... | 701/31.4 |
| 8,849,507 B2 * | 9/2014 | Popp et al. | ........................ | 701/36 |
| 8,849,555 B2 * | 9/2014 | Scofield et al. | ................ | 701/123 |

(Continued)

FOREIGN PATENT DOCUMENTS

| | | |
|---|---|---|
| EP | 1842758 A1 | 10/2007 |
| EP | 2230146 A2 | 9/2010 |

*Primary Examiner* — Thomas Tarcza
*Assistant Examiner* — Richard Goldman
(74) *Attorney, Agent, or Firm* — Frank A. MacKenzie; Bejin Bieneman PLC

(57) ABSTRACT

An estimated fuel consumption may be determined for a route for a vehicle. At least in part based on the estimated fuel consumption, it may be determined that an amount of fuel in the vehicle is insufficient for the vehicle to traverse the route and/or one or more waypoints may be identified within a predetermined distance of the route, e.g., waypoints for refueling the vehicle. The estimated fuel consumption may be determined in a computer system included in the vehicle.

16 Claims, 3 Drawing Sheets

(56) References Cited

U.S. PATENT DOCUMENTS

| | | | |
|---|---|---|---|
| 8,849,742 B2* | 9/2014 | Lovett et al. | 706/58 |
| 8,855,840 B2* | 10/2014 | Fleming et al. | 701/22 |
| 8,880,337 B2* | 11/2014 | Scholl | 701/426 |
| 2005/0055157 A1* | 3/2005 | Scholl | 701/207 |
| 2006/0293993 A1 | 12/2006 | Dale | |
| 2008/0249667 A1 | 10/2008 | Horvitz et al. | |
| 2011/0106429 A1 | 5/2011 | Poppen et al. | |
| 2011/0166774 A1* | 7/2011 | Schunder | 701/201 |
| 2011/0184642 A1 | 7/2011 | Rotz et al. | |
| 2012/0226435 A1* | 9/2012 | Yuasa | 701/123 |
| 2014/0107912 A1* | 4/2014 | Yucel et al. | 701/123 |

\* cited by examiner

VEHICLE FUELING ROUTE PLANNING

BACKGROUND

Given a specified starting point, and a specified destination, or end, point, a vehicle navigation system may generate a suggested route for a vehicle. For example, a vehicle navigation system or other route generating system may generate a route to optimize travel time, minimize distance traveled, etc. However, vehicle navigation systems are not configured to take into account certain data obtainable concerning a vehicle's history and present status, and further are not configured to take into account certain factors that may be relevant to an planning a vehicle route. For example, current mechanisms for determining a vehicle's fuel status, and for adjusting a route, selecting waypoints, etc., are lacking.

DRAWINGS

DESCRIPTION

System Overview

Figure 1:
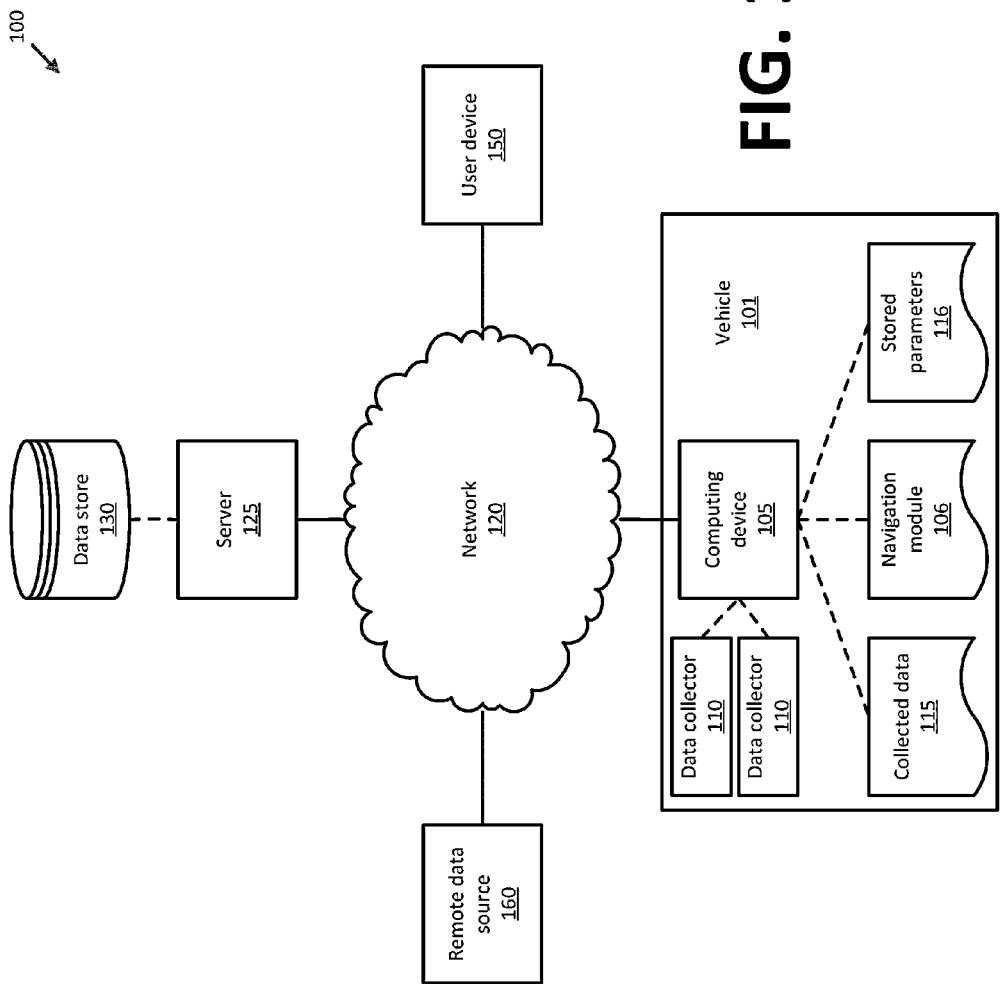
FIG. 1 is a block diagram of an exemplary vehicle system

FIG. 1 is a block diagram of an exemplary system 100 for route planning incorporating fuel costs and other data. A computing device 105 in the vehicle 101 generally includes a navigation module 106. Further, the computing device 105 generally receives user input and/or provides output to a user via a human machine interface (HMI), and also receives and processes collected data 115 from one or more data collectors e.g. sensors. Further, the computer 105 generally receives as input and/or stores parameters 116 that, possibly along with collected data 115, may be used by the navigation module 106 to generate one or more routes for the vehicle 101. Alternatively or additionally, a navigation module 106 and other instructions and/or data described herein as executable or stored in the computer 105 may be included in a user device 150 such as a smartphone or the like. A remote server 125 may also provide data, e.g., retrieved from a data store 130, for use in navigation and/or route planning.

Exemplary System Elements

A vehicle 101, e.g., an automobile, light truck, medium or heavy-duty truck, an aircraft, a watercraft, etc., includes a vehicle computer 105 that generally includes a processor and a memory, the memory including one or more forms of computer-readable media, and storing instructions executable by the processor for performing various operations, including as disclosed herein. Further, the computer 105 may include or be communicatively coupled to more than one computing device, e.g., controllers or the like included in the vehicle 101 for monitoring and/or controlling various vehicle components, e.g., an engine control unit (ECU), transmission control unit (TCU), etc.

The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

In addition, the computer 105 may be configured for communicating with the network 120, which, as described below, may include various wired and/or wireless networking technologies, e.g., cellular, Bluetooth, wired and/or wireless packet networks, etc. Further, the computer 105, receiving data, e.g., from one or more data collectors 110 and/or a human machine interface (HMI), such as an interactive voice response (IVR) system, a graphical user interface (GUI) including a touchscreen or the like, etc. The computer may also provide outputs, e.g., to display a route or routes for the vehicle 101, receive user input relating to a route, selecting a route, etc.

Generally included in instructions stored in and executed by the computer 105 (or, alternatively or additionally, in a user device 150) is a navigation module 106. Using data received in the computer 105, e.g., from data collectors 110, data included as stored parameters 116, and/or data from the server 125, etc., the module 106 may provide navigation assistance, including generating one or more routes and/or potential routes for the vehicle 101.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like for detecting conditions outside the vehicle 101, e.g., medium-range and long-range sensors. For example, sensor data collectors 110 could include mechanisms such as RADAR, LADAR, sonar, cameras or other image capture devices, that could be deployed to measure a distance between the vehicle 101 and other vehicles or objects, to detect other vehicles or objects, and/or to detect road conditions, such as curves, potholes, dips, bumps, changes in grade, etc. In addition, data collectors 110 may include sensors internal to the vehicle 101, such as accelerometers, temperature sensors, motion detectors, etc. to detect motion or other conditions of the vehicle 101.

A memory of the computer 105 generally stores collected data 115. Collected data 115 may include a variety of data collected in a vehicle 101 from data collectors 110. Examples of collected data 115 are provided above, and moreover, data 115 may additionally include data calculated therefrom in the computer 105. In general, collected data 115 may include any data that may be gathered by a collection device 110 and/or computed from such data. Accordingly, collected data 115 could include a variety of data related to vehicle 101 operations and/or performance, as well as data related to in particular relating to motion of the vehicle 101. For example, collected data 115 could include data concerning a vehicle 101 speed, acceleration, routes traveled, fuel consumption, etc.

A memory of the computer 105 may further store one or more parameters 116. A parameter 116 may include user preferences for route generation and/or selection, e.g., choose fastest, choose most economical, weights to be given to factors such as fuel costs, time of travel, etc., in route generation and/or selection, etc.

Further, collected data 115 and/or parameters 116 could include data collected from a user device 150, a remote source 160, or some other mechanism. For example, parameters 116 could be determined from data gathered from an HMI of the computer 105 and/or a user device 150 concerning user preferences, e.g., concerning preferred points of interest, route preferences, etc. Further, collected data 115 could include data from biometric sensor data collectors 110, e.g., indicating a vehicle 101 operator's likely age, gender, etc.

Yet further, collected data 115 could be provided from other vehicle 101 subsystems communicatively coupled to the vehicle 101, such as hardware including a processor and a memory storing firmware personalized for a vehicle 101 operator, e.g., a safety system that identifies a vehicle 101 operator, e.g., via biometric sensor data collectors 110, via a system that identifies an operator according to an electronic key, etc., and that implements certain operations and/or restrictions in the vehicle 101 based on the operator identity. Further, the collected data 115 could be used to generate parameters 116. For example, according to an operator identity, the vehicle 101 could be restricted form traveling on certain roads, e.g., highways, from traveling after certain hours of the day, etc.; one or more parameters 116 could be implemented to enforce such restrictions. Even further, collected data 115 could be obtained from one or more remote sites 160, i.e., the computer 105 could communicate directly with a remote site 160 and/or could receive collected data 115 from the server 125 that the server 125 received from a remote site 160, e.g., fuel prices, current or predicted weather, etc.

In another example, collected data 115 could include historical and/or real-time (or near real-time) traffic data that is collected and stored in the server 125, e.g., from remote sites 160, and provided to the vehicle 101 computer 105. Using such collected data 115, the computer 105 could, e.g., where it was determined that the vehicle 101 was approaching a high traffic area at a time when traffic delays were possible, or likely, recommend that a vehicle 101 refuel, visit a refueling waypoint, etc. Likewise, information relating to road construction could be provided, e.g., road closures, lane closure, bridge work, etc., that may cause traffic delays, detours, etc.

The network 120 depicted in FIG. 1 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 116, e.g., that might be uploaded from one or more vehicle 101 computers 105. For example, one or more parameters 116 for a particular user could be stored in the server 125 and retrieved by the computer 105 when the user was in a particular vehicle 101.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, a known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

One or more remote sites 160 may be accessible to the server 125 and or a computer 105 via the network 120, e.g., the Internet. For example, a remote site 160 could be a social network or the like, providing data 115 relating to a vehicle 101 operators preferred brands of restaurant, fuel, etc., preferred routes, and other personal attributes. Further, a remote site may provide collected data 115, e.g., for use in determining parameters 116, or that may be compared to parameters 116. For example, as mentioned above, collected data 115 from a remote site 160 could indicate one or more re-fueling stations in a geographic area. Such collected data 115 could be compared to a user parameter 116 specifying the user's preferred brand of fuel.

Exemplary Process Flow

Figure 2:
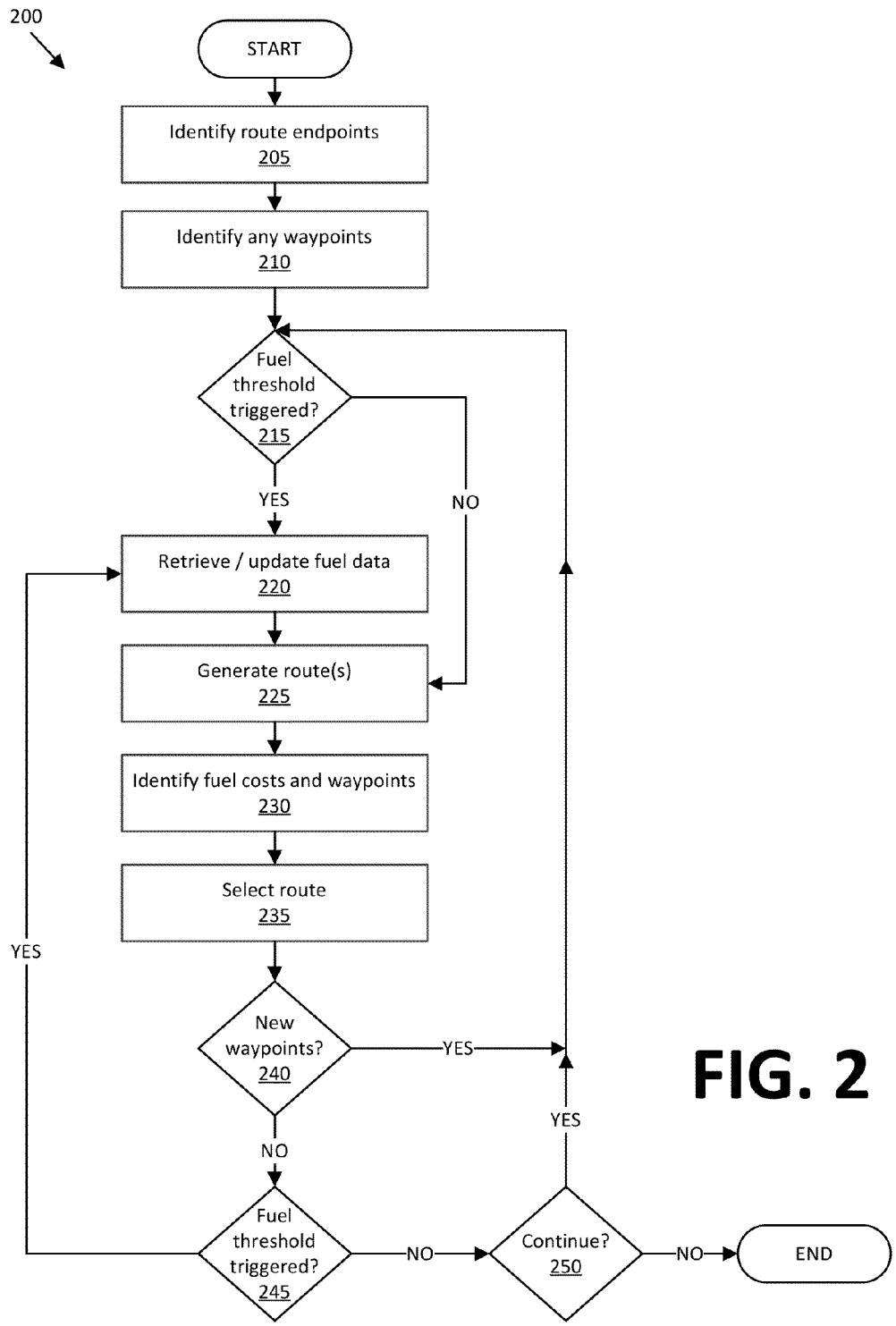
FIG. 2 is a diagram of an exemplary process for vehicle route generation and/or selection.

FIG. 2 is a diagram of an exemplary process 200 for vehicle 101 route generation and/or selection. Steps of the process 200 are ascribed to the computer 105, but as mentioned above, some or all of the steps of the process 200 could alternatively or additionally be carried out according to instructions executed by a user device 150.

The process 200 begins in a block 205, in which the computer 105 identifies route endpoints for a route to be traversed by the vehicle 101. For example, the navigation module 106 may receive user input specifying a request for a route between a beginning point and a destination, or end, point of a route.

Further, collected data 115 and/or parameters 116 may be retrieved, e.g., from a memory of the computer 105 and/or the server 125, and used to specify route start points and endpoints. For example, parameters 116 may be stored according to commuting patterns or the like in a vehicle 101. For example, a vehicle 101 is powered on at a particular time of day and/or day of week as indicated by a clock maintained by the computer 105, and then used to go from a given beginning point to a given destination point, the computer 105 may, after this pattern is repeated a given number of times, store a parameter or parameters 116 indicating that, as a default, the navigation module 106 should assume the given beginning and endpoints for a route. Likewise, the computer 105 could store previous routes traversed one or more times in a vehicle 101 as parameters 116, and then, based on collected data 115 showing that a vehicle 101 was traversing one of these previous routes, could retrieve from parameters 116 beginning and endpoints for a current route of the vehicle 101 based on such prior routes. Similarly, a parameter 116 could specify a route endpoint simply from collected data 115 showing the current location, e.g., a route beginning point, of the vehicle 101.

Next, in a block 210, the computer 105 identifies waypoints for a route of the vehicle 101. For example, user input could be received specifying waypoints to be traversed between a route beginning point and a route ending point, e.g., a user could specify to identify restaurants, refueling stations, restrooms, convenience stores, etc. between a route beginning point in a route ending point. Further for example one or more waypoints could be inferred from parameters 116, e.g., a vehicle 101 always visits a particular donut shop during a morning commute, a parameter 116 therefore identifying the donut shop location.

Likewise, e.g., where a beginning point and an ending point were a distance apart such that refueling may be required to reach a destination point, where collected data 115 indicates that a vehicle 101 fuel level is below a certain threshold, e.g., less than half a tank, etc., re-fueling locations between a start point and endpoint could be retrieved from data stored with the navigation module 106. Further, such refueling locations could be selected according to parameters 116, e.g., the parameters 116 may store a user's preference for a brand of fuel and/or may specify that the user simply wants the cheapest possible refueling option. Further, refueling station waypoints could be selected according to fuel prices associated with respective waypoints. For example, current average fuel prices for refueling stations in a certain geographic area, within a predetermined distance, e.g., ½ mile, of a route, etc., could be retrieved by the computer 105 from a server 125 on a periodic, near real-time, or real-time basis, whereupon the computer 105 could select the refueling waypoints according to the cheapest fuel prices available, e.g., display only the cheapest 10%, 25%, etc. Further, when a refueling waypoint is displayed, e.g., represented by an icon or the like, with reference to a route, an average or representative fuel price associated with the waypoint could also be displayed.

In addition, waypoints could be selected based on an association with one another. For example, in the event that the computer 105 determines that refueling waypoints should be provided with a route, refueling waypoints could be selected according to their proximity to other waypoints. For example, a parameter 116 could specify a user preference for a particular chain of restaurants, whereupon only refueling stations within a predetermined distance, e.g., ¼ mile, of a location of a restaurant in the chain would be provided as waypoints. Alternatively or additionally, a user could provide input via a vehicle 101 HMI to request a search for restaurants near a route. Upon detecting a refueling need, the computer 105 could select only refueling waypoints located near, e.g., at a same highway exit as, a restaurant waypoint, to maximize trip efficiency and minimize overall travel time.

Next, in a block 215, the computer 105 determines whether a fuel-related threshold in the vehicle 101 is triggered. For example, as mentioned in the previous paragraph, the computer 105 may detect whether a vehicle 101 fuel level is below a certain threshold, e.g., half a tank, the court of the tank, etc. Further, a vehicle 101 fuel level may be taken into account as a single collected data 115, or in combination with one or more items of collected data 115, e.g., a distance between a beginning point and an ending point in a route, a calculation of likely fuel consumption to traverse a route from the beginning point to the ending point, and a determination of whether refueling will be required to reach the destination point. In this example, if a computation determined that refueling would likely be required to reach the destination point, then the fuel-related threshold would be triggered. Moreover, a fuel-related threshold could be triggered where a user provided input that a vehicle 101 should be refueled at a particular time, before reaching a particular destination or waypoint, etc.

In any event, if a fuel-related threshold is triggered, then a block 220 is executed next. Otherwise, the process 200 proceeds to a block 225.

In the block 220, the computer 105 retrieves and/or updates refueling data stored as parameters 116. As explained above, the block 220 is executed where it has been determined that refueling is desired or necessary on a route between the specified endpoints. Accordingly, the computer 105 retrieves one or more possible refueling waypoints that may have been identified above as described with respect to the block 210, and further retrieves data indicating fuel costs, e.g., price per gallon for a type of fuel used by the vehicle 101, a price for re-charging batteries used to fuel the vehicle 101, etc., associated with each respective refueling waypoints. Such data may be retrieved in real-time or near real-time from the server 125 and/or may be periodically refreshed from the server 125 and/or some other source.

Following either the block 215 or the block 220, in a block 225, the computer 105 generates one or more possible routes for the vehicle 101 between the specified endpoints. For example, a known manner according to various criteria, e.g., shortest distance between the specified endpoints, a shortest time to traverse the specified endpoints, use only major roads or highways, avoid major highways, etc. Further, the computer 105 could take into account various waypoints between the specified endpoints, e.g., the computer 105 could provide a first route including a certain waypoint, and a second route not including the waypoint.

Next, in a block 230, for each route generated in the block 225, the computer 105 computes an estimated fuel cost for traversing the route, and may also identify fuel stations and other waypoints that may be associated with the route.

In general, for each route generated in the block 225, an estimated fuel cost for the route may be computed, e.g., a parameter 116 could include an average price paid for a certain amount, e.g., a gallon, of fuel for the vehicle 101. Alternatively, an average estimated refueling price could be computed from refueling data stored as described above with respect to the block 220.

Further, parameters 116 could indicate an expected rate of fuel consumption, e.g., miles per gallon, consumption of an electric battery, etc., for the vehicle 101. The expected rate of fuel consumption could be stored from available figures for a particular vehicle 101 type, powertrain, etc., provided by a governmental agency or third party, e.g., the Environmental Protection Agency. Alternatively, the computer 105 could compute an expected rate of fuel consumption based on collected data 115, including an amount of fuel consumed on prior trips covering specified distances, specified types of roads in terrain, etc.

Using the expected rate of fuel consumption, expected average price to be paid for fuel, and a distance, type of terrain, type of road, etc., for a given route, an estimated fuel cost for the route may be computed. Further, other factors may be taken into account. For example, the computer 105 could acquire from the server 125 or some other source such as a remote site 160, data relating to current weather conditions, traffic conditions, construction conditions, etc. Accordingly, situations where an expected rate of fuel consumption could be affected by traffic, e.g., higher than normal because of slow traffic conditions, or weather, e.g., lower than normal because of a strong tailwind, the expected rate of fuel consumption, and hence the expected fuel cost for traversing a route, could be adjusted appropriately.

Also, as mentioned above, the block 230 may include identifying waypoints that may be included on a particular route. For example, a user may have specified a desire to stop at a restaurant between the specified endpoints, whereupon the computer 105 may identify waypoints on or within a specified distance, e.g., one mile, five miles, etc., of a given route. Likewise, the computer 105 may identify refueling stations on a given route, and may further indicate likely cost of refueling, e.g., a price for a gallon of fuel, a price of electricity, etc., associated with one or more of the indicated refueling stations. Waypoints, including refueling waypoints, may be identified by the computer 105 as described above concerning the block 210, and then selected for inclusion with, or to be provided along with, a particular route as described in this block 230.

Figure 3:
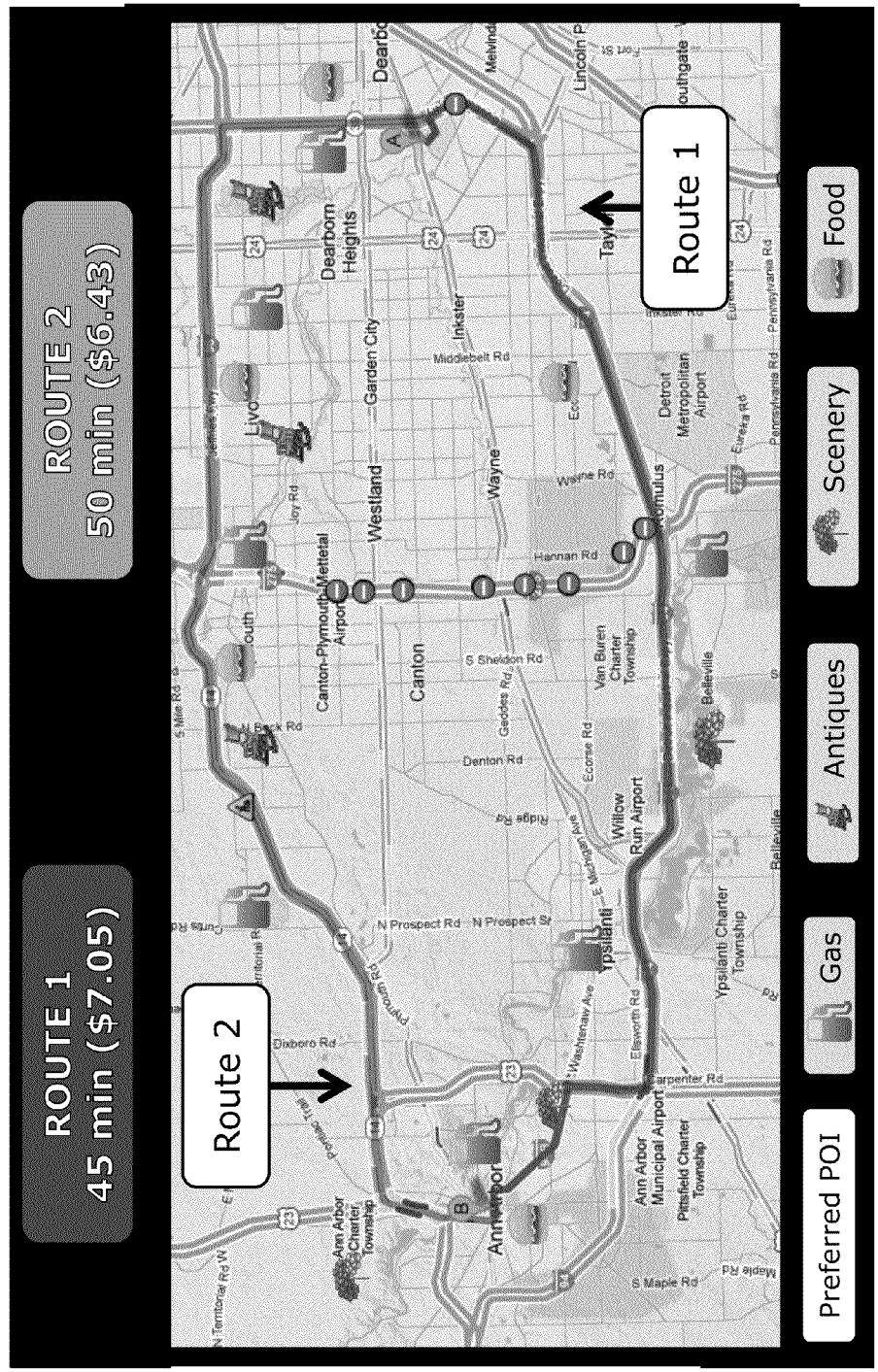
FIG. 3 illustrates an exemplary user interface for providing possible routes for user selection.

Following the block 230, in a block 235, the computer 105 selects a route from the routes generated in the block 225. Selection of a route may be according to user input and/or one or more parameters 116. For example, the computer 105 may receive user input indicating a route to be selected. FIG. 3 illustrates an exemplary user interface 300 for providing possible routes for user selection. In the example of FIG. 3, a user is provided with a first route and a second route between two endpoints for selection. Further, the interface 300 provides information including an estimated time to traverse each of the routes, as well as an estimated fuel cost for each of the two routes. As can be seen, the interface 300 also provides information about various waypoints on each of the two routes in the form of icons representing the possible waypoints, e.g., refueling stations, antique stores, scenic areas, and restaurants. In this example, a first route has a lower travel time, but a higher fuel cost, then a second route. As noted above, various factors can influence a fuel cost, including traffic, weather, likely cost of fuel along a route, etc. In any event, the interface 300 would allow a user to select between the two routes.

Moreover, as mentioned above, the computer 105 could include instructions for selecting a route without user input. For example, the computer 105 could be configured, e.g., according to a parameter 116 provided by previous user input, to always select a route with a least travel time, to always select a route with lowest fuel costs, to near a particular chain of fuel stations, restaurants, rest stops, etc.

After a route is selected as described with respect to the block 235, and the vehicle 101 begins to traverse the route, in a block 240, the computer 105 determines whether a route should be modified to add new waypoints. For example, a user may provide input requesting to locate a restaurant, retail store, refueling station, etc. on a route.

Further, the computer 105 could be configured to provide alerts in response to which a user could select a new waypoint. For example, during or prior to a refueling process, the computer 105 could detect that a vehicle 101 was at a particular refueling station, and could further determine that a less expensive refueling station was within a predetermined distance of the selected route, e.g., ½ mile, 1 mile, 5 miles, etc., and could be reached with an amount of fuel remaining in the vehicle 101. The computer 105 could further give the user an option to add the less expensive fueling station as a waypoint.

In any event, of input has been received to add a waypoint, or it is otherwise determined to add a waypoint, then the process 200 returns to the block 215, whereupon a route selected in the block 235 may be modified as appropriate, e.g., according to the steps of the process 200 discussed above. Otherwise, the process proceeds to a block 245.

In the block 245, the computer 105 determines whether a fuel-related threshold has been triggered. For example, as mentioned above, the computer 105 could be configured to determine when a vehicle 101 fuel level has fallen below a certain threshold, when the vehicle 101 is likely to require refueling before reaching a destination point, etc. If a fuel-related threshold has been triggered, then the process 200 returns to the block 220, whereupon, as discussed above with respect to the block 220 and the following blocks, a new route or routes could be generated including one or more waypoints for accommodating vehicle 101 refueling needs and/or allowing the vehicle 101 to reach the specified destination point without refueling. Otherwise, the process 200 proceeds to a block 250. As noted below, processes discussed herein could include other steps, or steps executed in a different order, than as disclosed herein. For example, the block 245 could be executed before the block 240.

In the block 250, the computer 105 determines whether the process 200 will continue. For example, if a destination point is reached, the vehicle 101 is powered off, etc., then the process 200 may end. If the process 200 should not continue, then the process 200 ends after the block 250. Otherwise, the process 200 returns to the block 215.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer for a vehicle, the computer comprising a processor and a memory, wherein the computer is configured to:
   determine an estimated fuel consumption for a route for the vehicle at least in part based on identifying an operator of the vehicle, and comparing collected data stored in the computer to characteristics of the identified operator;
   determine, based at least in part on the estimated fuel consumption, that an amount of fuel in the vehicle is insufficient for the vehicle to traverse the route; and
   recommend one or more waypoints within a predetermined distance of the route for refueling the vehicle.

2. The system of claim 1, wherein the computer is further configured to estimate a fuel cost for the route based at least in part on the estimated fuel consumption.

3. The system of claim 1, wherein the operator characteristics are stored in a personalized hardware system.

4. The system of claim 1, wherein the estimated fuel consumption is based in part on collected data stored in the computer relating to at least one of a weather condition, a traffic condition, and a construction condition.

5. The system of claim 1, wherein the computer is further configured to recommend a waypoint based at least on one of a driving history of the vehicle and user input concerning a preferred waypoint.

6. The system of claim 1, wherein the computer is further configured to use data received from a remote server in part to determine at least one of the estimated fuel consumption and the one or more waypoints.

7. The system of claim 1, wherein the computer is further configured to use data received via operator input to the computer in part to recommend the one or more waypoints.

8. The system of claim 1, wherein the computer is further configured to:
   generate at least a second route between the starting point and the ending point; and
   present each of the route and the second route for selection in a human machine interface along with an estimated fuel cost for each of the route and the second route.

9. A method, comprising:
   determining, in a vehicle computer, an estimated fuel consumption for a route for the vehicle at least in part based on identifying an operator of the vehicle, and comparing collected data stored in the computer to characteristics of the identified operator;
   determining, based at least in part on the estimated fuel consumption, that an amount of fuel in the vehicle is insufficient for the vehicle to traverse the route; and
   recommending one or more waypoints within a predetermined distance of the route for refueling the vehicle.

10. The method of claim 9, further comprising estimating a fuel cost for the route based at least in part on the estimated fuel consumption.

11. The method of claim 9, wherein the operator characteristics are stored in a personalized hardware system.

12. The method of claim 9, wherein the estimated fuel consumption is based in part on collected data stored in the computer relating to at least one of a weather condition, a traffic condition, and a construction condition.

13. The method of claim 9, further comprising recommending a waypoint based at least on one of a driving history of the vehicle and user input concerning a preferred waypoint.

14. The method of claim 9, further comprising using data received from a remote server in part to determine at least one of the estimated fuel consumption and the one or more waypoints.

15. The method of claim 9, further comprising using data received via operator input to the computer in part to recommend the one or more waypoints.

16. The method of claim 9, further comprising:
   generate at least a second route between the starting point and the ending point; and
   present each of the route and the second route for selection in a human machine interface along with an estimated fuel cost for each of the route and the second route.

* * * * *